United States Patent
Fleischmann et al.

(10) Patent No.: US 9,802,219 B2
(45) Date of Patent: Oct. 31, 2017

(54) POLYMER WORKPIECE FOR FLOW COATING

(71) Applicant: SAINT-GOBAIN GLASS FRANCE, Courbevoie (FR)

(72) Inventors: Wolfgang Fleischmann, Leutenbach (DE); Marcus Guldan, Uhingen (DE); Dominic Gueldner, Ostfiltern (DE); Thomas Lux, Weissach Im Tal (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 136 days.

(21) Appl. No.: 14/351,093

(22) PCT Filed: Nov. 2, 2012

(86) PCT No.: PCT/EP2012/071712
§ 371 (c)(1),
(2) Date: Apr. 10, 2014

(87) PCT Pub. No.: WO2013/087290
PCT Pub. Date: Jun. 20, 2013

(65) Prior Publication Data
US 2014/0302235 A1 Oct. 9, 2014

(30) Foreign Application Priority Data

Dec. 14, 2011 (EP) ..................... 11193449

(51) Int. Cl.
| G02B 1/10 | (2015.01) |
| B05D 7/02 | (2006.01) |
| B05D 1/30 | (2006.01) |
| B29C 45/00 | (2006.01) |

(52) U.S. Cl.
CPC ............... B05D 1/30 (2013.01); B05D 7/02 (2013.01); B29C 45/0046 (2013.01);
(Continued)

(58) Field of Classification Search
CPC ............... Y10T 428/24488; Y10T 428/24777; B05D 7/02; B05D 1/30; B05D 2201/02;
(Continued)

(56) References Cited

U.S. PATENT DOCUMENTS 4,377,611 A * 3/1983 Fischer ................. B64C 1/1484
264/291
4,874,654 A * 10/1989 Funaki .................... B29C 45/16
296/84.1
(Continued)

FOREIGN PATENT DOCUMENTS

EP 2394747 12/2011
EP 2394747 A1 * 12/2011 ............... B05D 1/30
(Continued)

OTHER PUBLICATIONS

International Search Report dated Dec. 11, 2012 for PCT/EP2012/071712 filed on Nov. 2, 2012, German to English translation.
(Continued)

Primary Examiner — Joanna Pleszczynska
(74) Attorney, Agent, or Firm — Steinfl + Bruno LLP

(57) ABSTRACT

A polymer workpiece is described. The workpiece has an upper main surface, a lower main surface, an injection-mold separating surface and a flow attack edge surface. The flow attack edge surface is formed in the region between the injection-mold separating surface and the lower main surface as a planar surface with an angle α with respect to the injection-mold separating surface of 20° to 70°, and/or deviates by an amount a from 0.0 mm to 0.5 mm from the planar surface.

30 Claims, 5 Drawing Sheets

Figure 4:
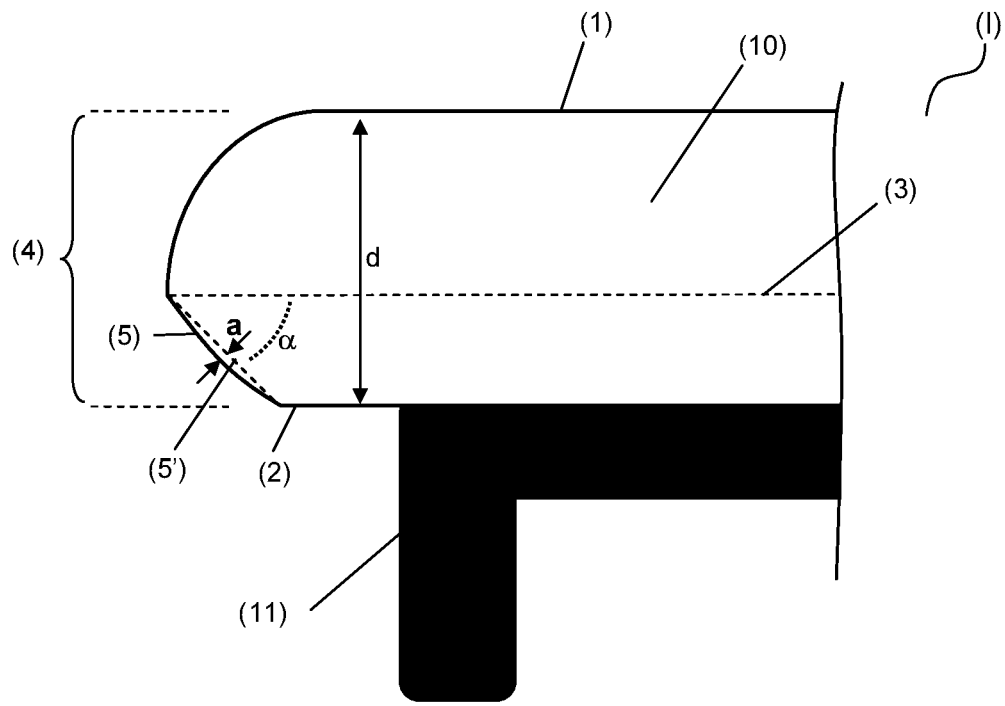

(52) U.S. Cl.
CPC ............ *B29C 45/0053* (2013.01); *G02B 1/10* (2013.01); *B05D 2201/02* (2013.01); *B29C 2045/0079* (2013.01); *Y10T 428/24488* (2015.01)

(58) Field of Classification Search
CPC ...... B05D 7/04; B05D 1/305; B29C 45/0046; B29C 2045/0079; B29C 45/0053; G02B 1/00
USPC .................... 428/157, 192, 220; 264/328.12; 118/DIG. 4; 427/163.1, 164, 165
See application file for complete search history.

(56) References Cited

U.S. PATENT DOCUMENTS

2002/0050664 A1* 5/2002 Moore, Jr. .......... B29C 45/0046 264/328.12

2011/0267713 A1 11/2011 Ventelon et al.

FOREIGN PATENT DOCUMENTS

| GB | 1097461 | 1/1968 |
| GB | 1201292 | 8/1970 |
| GB | 2123841 | 2/1987 |
| WO | 2008/134768 | 11/2008 |

OTHER PUBLICATIONS

International Search Report for PCT/EP2012/071712 filed Nov. 2, 2012 on behalf of Saint-Gobain Glass France, dated Dec. 11, 2012. German original + English translation. 5 pages.

Written Opinion for PCT/EP2012/071712 filed Nov. 2, 2012 on behalf of Saint-Gobain Glass France, dated Dec. 11, 2012. German original + English translation. 14 pages.

* cited by examiner

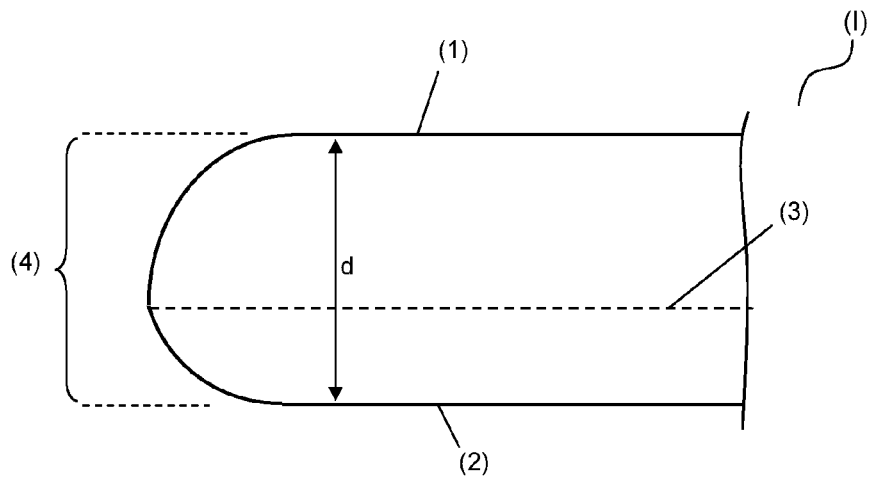
Fig. 1 – Prior Art
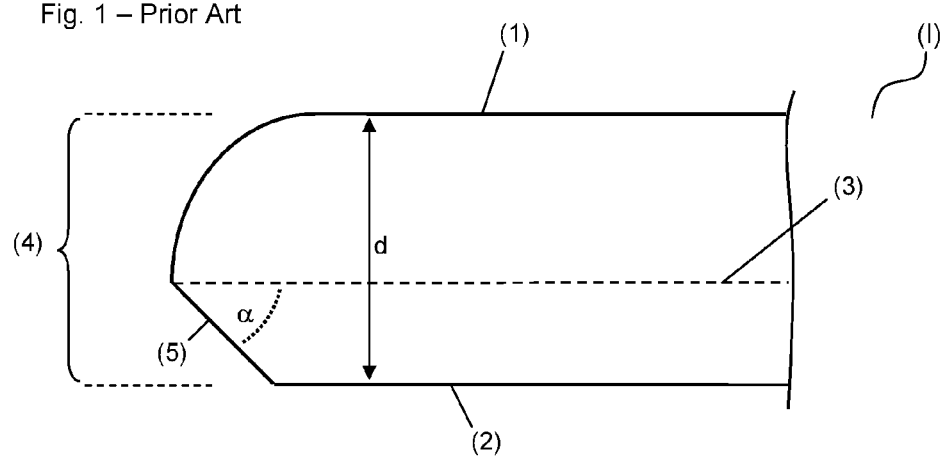
Fig. 2
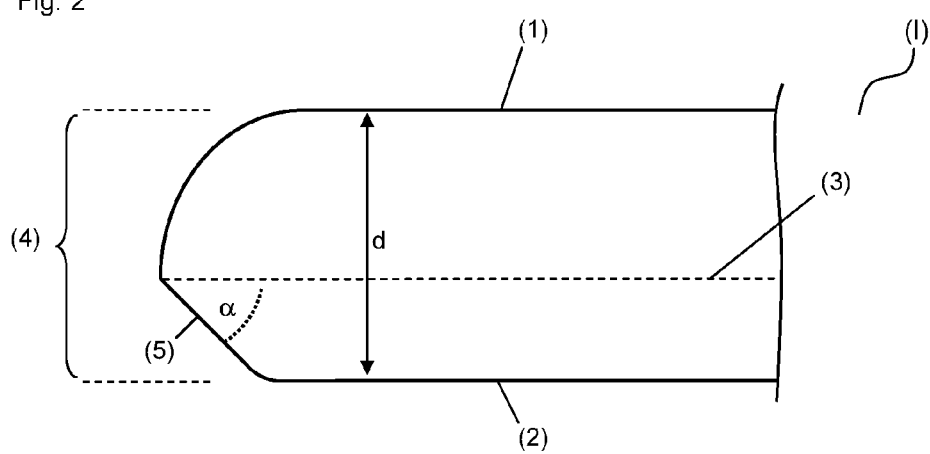
Fig. 3

POLYMER WORKPIECE FOR FLOW COATING

CROSS REFERENCE TO RELATED APPLICATIONS

The present application is the US national stage of International Patent Application PCT/EP2012/071712 filed on Nov. 2, 2012 which, in turn, claims priority to European Patent Application EP 11193449.3 filed on Dec. 14, 2011.

The invention relates to a polymer workpiece for flow coating, a method for producing a coated polymer workpiece, and its use.

Polymer workpieces are frequently provided with a coating or varnish. Thus, for one thing, the visual appearance such as the color or gloss of the polymer workpiece can be affected. For another, the polymer workpiece can be protected against chemical and mechanical damage as well as against UV radiation by a coating. Such protective coatings are necessary in particular for polymer workpieces that are exposed to severe stresses from environmental influences and that must at the same time satisfy high quality requirements, for instance, relative to surface finish and transparency. This is the case, for example, for polymer glazings for motor vehicles.

A common method for coating polymer workpieces in large quantities is flow coating. The workpiece is impinged on from the upper edge with a coating solution, for example, by means of one or a plurality of fixedly mounted flow-coat nozzles, a paint curtain, or a movable flow robot arm. The coating solution running down wets the workpiece. Methods for flow coating are known, for example, from GB 1,097,461 A, GB 1,201,292 A, GB 2,123,841 A, and WO 2008/134768 A1.

A disadvantage of flow coating results from the flow dynamics of the coating solution in the attack region and in adjacent regions of the workpiece. Coating flow problems, which appear, for example, as inadequate layer thickness, coating runs, curtaining, or sawtooth effects, are frequently observed.

One object of the present invention is to provide a polymer workpiece, with which flow problems in the attack region are avoided during flow coating. Another object of the present invention is to provide a method for producing a coated polymer workpiece, with which flow problems in the attack region of the workpiece are avoided.

The object of the present invention is accomplished according to the invention by a polymer workpiece, comprising at least an upper main surface, a lower main surface, an injection-mold separating surface, and a flow attack edge surface, wherein the flow attack edge surface is formed in the region between the injection-mold separating surface and the lower main surface as a planar surface with an angle relative to the injection-mold separating surface from 20° to 70° and/or deviates by an amount from 0.0 mm to 0.5 mm from the planar surface.

The upper main surface of the polymer workpiece is intended to be provided with a coating by means of flow coating. Special areas of application for the finished polymer workpiece such as, for instance, use as roof, rear, or side glazing for motor vehicles can make it necessary to also additionally coat the polymer workpiece on the lower main surface.

Particularly suited for the flow coating according to the invention are pane-shaped or plate-shaped polymer workpieces, for example, plastic panes or plastic covers.

In the context of the invention "flow attack edge surface" refers to that edge surface of the workpiece that is intended to point upward during the flow coating of the polymer workpiece. The polymer workpiece is arranged at an angle from 25° to 85° relative to the horizontal, with the lower main surface facing the ground. The polymer workpiece is flooded from the flow attack edge surface onward with the coating solution. Through evaporation of the solvent of the coating solution, the upper main surface is provided with a coating.

According to the prior art, the edge surfaces of a polymer workpiece are formed rounded. In cross-section, the edge surfaces can, for example, form an arc of a circle, in particular a semicircle, whose diameter corresponds to the thickness of the polymer component. However, more complex edge rounding can also appear, with the radius of curvature depending on the distance to the main surfaces of the polymer workpiece. However, in the prior art, no abrupt changes in the curvature in the form of "sharp" transitions appear within the edge surfaces.

It has been surprisingly demonstrated that the configuration of the flow attack edge surface according to the invention results in a significantly improved flow of the coating on the upper main surface of the polymer workpiece. By means of the region of the flow attack edge surface configured according to the invention between the injection-mold separating surface and the lower main surface, which, in comparison to the prior art, can be regarded as beveling, the coating solution is predominantly guided via the flow attack edge surface in the direction of the lower main surface. The coating solution can the not flow increasingly onto the upper main surface. Flow problems of the coating, for example, coating runs, can thus surprisingly be reduced or even completely avoided.

According to the invention, the polymer workpiece is preferably prepared in a single- or multi-component injection-molding process or single- or multi-component injection-compression molding process, particularly preferably in combination with turning plate technology. An upper and a lower injection-mold are guided against each other in a positively locking manner. A cavity is formed by the two injection-molds. The molten polymer material is injected into the cavity. After hardening of the polymer material, the polymer workpiece can be removed from the injection-molds. In a preferred embodiment, in an additional step before the removal of the polymer workpiece, another, for the most part darkly tinted, opaque component is injected onto the workpiece. The shape of the polymer workpiece corresponds to the shape of the cavity formed by the injection-molds.

In the context of the invention, the term "injection-mold" also includes molds for injection-compression molding and other special injection-molding techniques.

The polymer workpiece can be flat or slightly or greatly curved in one or more spatial directions.

The upper main surface is preferably implemented smooth. In this case, the term "smooth" refers to a surface that has no spatially limited protrusions and/or indentations. The lower main surface can likewise be implemented smooth, but can also have a complex shape. For example, shaped elements that serve to fix or position the polymer workpiece at the site of its use, for example, as an opaque component of the polymer workpiece, can be injection-molded in the region of the lower main surface. However, the lower main surface preferably has at least one smooth region that is adjacent the flow attack edge surface. The smooth upper main surface and the smooth region of the lower main surface are preferably implemented parallel to each other. The distance between the smooth upper main surface and the smooth region of the lower main surface adjacent the flow attack edge surface is referred to, in the context of the invention, as the thickness d of the polymer workpiece adjacent the flow attack edge surface.

The surface that is spanned during the injection-molding of the polymer workpiece by the boundary line between the two injection-molds is referred to, in the context of the invention, as the injection-mold separating surface. The injection-mold separating surface is preferably arranged parallel to the upper main surface of the polymer workpiece. If the upper main surface is formed curved, the injection-mold separating surface is also formed curved. The distance of the injection-mold separating surface from the upper main surface is preferably from 20% to 80%, particularly preferably from 33% to 67% of the thickness d of the polymer workpiece adjacent the flow attack edge surface. Particularly good results with regard to coating distribution are thus obtained.

In an advantageous embodiment of the invention, the region of the flow attack edge surface between the injection-mold separating surface and the lower main surface is formed as a planar surface. The angle between the planar surface and the injection-mold separating surface is, according to the invention, from 20° to 70°. In the case of a curved injection-mold separating surface, the tangential surface on the injection-mold separating surface on the section line between the injection-mold separating surface and the flow attack edge surface must be used to determine the angle.

The angle between the planar surface and the injection-mold separating surface is preferably from 30° to 60°, particularly preferably from 35° to 55°. Particularly good results with regard to coating distribution on the upper main surface of the polymer workpiece are thus obtained.

The region of the flow attack edge surface between the injection-mold separating surface and the lower main surface can, in an alternative advantageous embodiment of the invention, however, also deviate slightly from an ideal planar surface and be formed slightly curved. In that case, the flow attack edge surface is preferably implemented convexly. "Convexly" means that the direction of curvature of the flow attack edge surface is turned toward the polymer workpiece. The region of the flow attack edge surface between the injection-mold separating surface and the lower main surface is thus arched outward. However, according to the invention, a planar surface with an angle relative to the injection-mold separating surface from 30° to 55°, preferably from 30° to 60°, particularly preferably from 35° to 55°, can be adapted on the region of the flow attack edge surface between the injection-mold separating surface and the lower main surface such that each point on the flow attack edge surface between the injection-mold separating surface on the lower main surface has a vertical distance of at most 0.5 mm to the adapted planar surface. The region of the flow attack edge surface between the injection-mold separating surface and the lower main surface deviates then, in the context of the invention, by an amount of 0.0 mm to 0.5 mm from the adapted planar surface. This means that the maximum distance of the flow attack edge surface in the region between the injection-mold separating surface and the lower main surface to the adapted planar surface is from 0.0 mm to 0.5 mm. The region of the flow attack edge surface between the injection-mold separating surface and the lower main surface preferably deviates by an amount from 0.0 mm to 0.3 mm, particularly preferably from 0.0 mm to 0.2 mm from the adapted planar surface. Particularly good results with regard to the coating distribution are thus obtained. The maximum distance of the flow attack edge surface in the region between injection-mold separating surface and the lower main surface to the adapted planar surface is preferably arranged in the center of the region of the flow attack edge surface between the injection-mold separating surface and the lower main surface.

The polymer workpiece according to the invention comprises at least an upper main surface, a lower main surface, an injection-mold separating surface, and a flow attack edge surface, with the flow attack edge surface deviating in the region between the injection-mold separating surface and the lower main surface by an amount from 0.0 mm to 0.5 mm from a planar surface at an angle relative to the injection-mold separating surface from 20° to 70°. If the deviation is 0.0 mm, the flow attack edge surface in the region between the injection-mold separating surface and the lower main surface is formed as a planar surface, with the angle of the planar surface relative to the injection-mold separating surface being from 20° to 70°. However, the region of the flow attack edge surface between the injection-mold separating surface and the lower main surface can also deviate slightly from an ideal planar surface and be shaped slightly curved. The deviation according to the invention of an adapted planar surface that has an angle relative to the injection-mold separating surface from 20° to 70°, is less than or equal to 0.5 mm, preferably less than or equal to 0.3 mm, and particularly preferably less than or equal to 0.2 mm. Each point on the flow attack edge surface between the injection-mold separating surface and the lower main surface thus has a vertical distance of at most 0.5 mm to the adapted planar surface.

In the transition region to the lower main surface, the flow attack edge surface can have a production related curve. The transition region preferably extends at most over 10%, particularly preferably at most over 5% of the thickness d of the polymer workpiece adjacent the flow attack edge surface. The characteristic of the flow attack edge surface according to the invention is also fulfilled in the presence of such a curve. If the region of the flow attack edge surface between injection-mold separating surface and the lower main surface according to the invention is implemented slightly curved, such a curve in the transition region must be excluded in the assessment of the characteristics according to the invention in the adaptation of a planar surface.

The other edge surfaces of the polymer workpiece near the flow attack edge surface can be configured like the flow attack edge surface. They can however also be configured in the conventional manner.

The region of the flow attack edge surface between the injection-mold separating surface and the upper main surface is formed convexly curved. There can be a uniform radius of curvature; however, the radius of curvature can also change with an increasing distance from the upper main surface. In the region between the injection-mold separating surface and the upper main surface, the flow attack edge surface is formed according to the prior art. In particular, the flow attack edge surface is clearly more sharply curved in the region between the upper main surface and the injection-mold separating surface than in the region between the injection-mold separating surface and the lower main surface.

The configuration according to the invention of the region of the flow attack edge surface between the injection-mold separating surface and the lower main surface is preferably introduced at the time of injection molding or injection-compression molding of the polymer workpiece. This can be achieved, for example, by means of the configuration of the injection mold. However, a polymer workpiece with a conventional edge configuration can also be mit injection molded or injection-compression molded first and the flow attack edge can be subsequently reconfigured according to the invention, for example, by milling, grinding, filing, or cutting.

The thickness d of the polymer workpiece adjacent the flow attack edge surface is preferably from 1 mm to 10 mm, particularly preferably from 2 mm to 7 mm. This is particularly advantageous with regard to the strength and the processing of the polymer workpiece. The surface area of the upper main surface is, for example, from 0.05 $m^2$ to 1.7 $m^2$.

The polymer workpiece preferably contains at least polyethylene (PE), polycarbonates (PC), polypropylene (PP), polystyrene, polybutadiene, polynitriles, polyesters, polyurethanes, polymethyl methacrylates, polyacrylates, polyesters, polyamides, polyethylene terephthalate, acrylonitrile butadiene styrene (ABS), styrene acrylonitrile (SAN), acrylonitrile styrene acrylester (ASA), acrylonitrile butadiene styrene-polycarbonate (ABS/PC), and/or copolymers or mixtures thereof. The polymer workpiece particularly preferably contains polycarbonates (PC), polyethylene terephthalate (PET), and/or polymethyl methacrylate (PMMA). This is particularly advantageous with regard to the processing, the strength, the weather resistance, and the chemical resistance of the polymer workpiece.

An opaque component of the polymer workpiece preferably further contains at least one colorant. The opacity of the component is obtained by means of the colorant. The colorant can contain inorganic and/or organic dyes and/or pigments. The colorant can be chromatic or achromatic. Suitable colorants are known to the person skilled in the art and can be looked up, for example, in the *Colour Index* of the *British Society of Dyers and Colourists* and the *American Association of Textile Chemists and Colorists*. A black pigment is preferably used as a colorant, for example, carbon black, aniline black, bone black, iron oxide black, spinel black, and/or graphite. Thus, a black opaque component is obtained.

In an advantageous embodiment of the invention, the flow attack edge surface has a region facing the lower main surface with a length from 0.005 mm to 0.1 mm, preferably from 0.01 mm to 0.05 mm, which runs along the injection-mold separating surface. By means of the combination of the region configured according to the invention of the flow attack edge surface between the injection-mold separating surface and the lower main surface with the region running along the injection-mold separating surface, part of the coating solution is particularly effectively guided over the flow attack edge surface in the direction of the lower main surface. This is particularly advantageous with regard to avoiding flow problems of the coating.

The object of the present invention is further accomplished according to the invention by a polymer workpiece, comprising at least an upper main surface, a lower main surface, an injection-mold separating surface, and a flow attack edge surface, wherein a region of the flow attack edge surface facing the lower main surface runs with a length from 0.005 mm to 0.1 mm along the injection-mold separating surface.

It has been surprisingly demonstrated that the configuration of the flow attack edge surface according to the invention results in a significantly improved flow of the coating on the upper main surface of the polymer workpiece. By means of the region running along the injection-mold separating surface, the flow attack edge surface has, in comparison to the prior art, an offset. Due to this offset, the coating solution is more intensely guided via the flow attack edge surface in the direction of the lower main surface. Thus, the coating solution cannot flow increasingly onto the upper main surface. Flow problems of the coating can thus surprisingly be reduced or even completely avoided.

The region of the flow attack edge surface that runs along the injection-mold separating surface preferably has a length from 0.01 mm to 0.05 mm. Particularly good results with regard to coating distribution on the upper main surface of the polymer workpiece are thus obtained.

The other edge surfaces of the polymer workpiece near the flow attack edge surface can be configured like the flow attack edge surface. However, they can also be configured in the conventional manner.

The region of the flow attack edge surface between the injection-mold separating surface and the upper main surface is formed convexly curved. There can be a uniform radius of curvature; however, the radius of curvature can also change with an increasing distance from the upper main surface. In the region between the injection-mold separating surface and the upper main surface, the flow attack edge surface is formed according to the prior art.

The region of the flow attack edge surface between the injection-mold separating surface and the lower main surface can likewise be formed convexly curved. There can be a uniform radius of curvature; however, the radius of curvature can also change with an increasing distance to the lower main surface. In the region between the injection-mold separating surface and the lower main surface, the flow attack edge surface can thus likewise be formed according to the prior art.

In a preferred embodiment of the invention, the region of the flow attack edge surface between the injection-mold separating surface and the lower main surface is formed as a planar surface with an angle relative to the injection-mold separating surface from 20° to 70°, preferably from 30° to 60°, particularly preferably from 35° to 55°. In another preferred embodiment, the region of the flow attack edge surface between the injection-mold separating surface and the lower main surface deviates by an amount from 0.0 mm to 0.5 mm, preferably from 0.0 mm to 0.3 mm, particularly preferably from 0.0 mm to 0.2 mm from the planar surface. Through the combination of the region according to the invention of the flow attack edge surface along the injection-mold separating surface with the region of the flow attack edge surface between injection-mold separating surface and the lower main surface, which is implemented flat or only slightly curved, part of the coating solution is particularly effectively guided via the flow attack edge surface in the direction of the lower main surface. This is particularly advantageous with regard to avoiding flow problems of the coating.

The region running according to the invention along the injection-mold separating surface of the flow attack edge surface is preferably introduced during injection molding or injection-compression molding of the polymer workpiece. This can be obtained, for example, through the configuration of the injection mold.

Alternatively, the region running along the injection-mold separating surface can be introduced into the flow attack edge surface by offset guiding of the upper and lower injection mold against each other. In this case, an opposing offset is introduced in the edge surface opposite the flow attack edge surface.

Alternatively, the region running along the injection-mold separating surface can be introduced into the flow attack edge surface by different tempering of the two injection molds. The two injection molds are constructed such that no offset is created inside the flow attack edge surface of the polymer workpiece, when they have the same temperature. Different tempering results in different thermal expansion of the two injection molds. This yields the offset along the injection-mold separating surface according to the invention.

However, a polymer workpiece can first be injection molded or injection-compression molded with a conventional edge configuration and the flow attack edge subsequently reconfigured according to the invention, for example, by milling, grinding, filing, or cutting.

The object of the present invention is further accomplished according to the invention by a method for producing a coated polymer workpiece, wherein at least:

a) a polymer workpiece according to the invention is provided, b) the polymer workpiece is arranged with the flow attack edge surface pointing upward at an angle relative to the horizontal from 25° to 85°, with the lower main surface facing the ground, and c) the polymer workpiece is flooded from the flow attack edge surface onward with a coating solution.

The polymer workpiece according to the invention is prepared in process step (a) preferably by single- or multi-component injection molding or by single- or multi-component injection-compression molding.

In the coating solution, the material that is to form the coating on the polymer workpiece is present in a liquid referred to as a solvent. In the context of the invention, the term "coating solution" is not limited to solutions in the narrower sense but also includes, for example, dispersions, suspensions, and emulsions.

The coating solution strikes at least on the flow attack edge surface. However, the coating solution can also strike a region of the upper main surface adjacent the flow attack edge surface.

The coating solution flows due to gravity from the flow attack edge surface via the polymer workpiece to the opposite edge. As a result of the evaporation of the solvent of the coating solution, the upper main surface of the polymer workpiece is provided with the coating.

By means of the flow attack edge surface of the polymer workpiece configured according to the invention, the flow coating results in a significantly improved coating distribution compared to the flow coating of conventional polymer workpieces. The configuration according to the invention of the flow attack edge surface causes the coating solution to be guided more intensely over the flow attack edge surface in the direction of the the lower main surface. The coating solution can thus not flow increasingly onto the upper main surface. Surprisingly, flow problems of the coating can thus be reduced or even completely avoided. This is a major advantage of the method according to the invention.

Depending on the size and the geometric shape of the workpiece to be coated, the coating solution can flow onto the workpiece, for example, from a paint curtain and/or from multiple nozzles arranged next to each other. Alternatively, the coating solution can be applied to the workpiece from a movable nozzle arm. This is necessary in particular when the intended use of the workpiece requires an additional coating of the workpiece on the lower main surface.

The polymer workpiece is preferably arranged at an angle from 35° to 70°, particularly preferably from 40° to 60° relative to the horizontal. For arranging the polymer workpiece at a defined angle relative to the horizontal, the polymer workpiece is preferably placed in a holder. The holder preferably contains metals and/or alloys, particularly preferably iron, aluminum, chromium, vanadium, nickel, molybdenum, manganese, or polymers such as polyethylene, polypropylene, polystyrene, polyurethanes, polycarbonates, polymethyl methacrylates, polyacrylates, polyesters, polyamides, and/or mixtures or copolymers thereof.

The solvent of the coating solution preferably contains at least water, alcohols, and/or ketones, particularly preferably methanol, 2-propanol, n-butanol, 1-methoxy-2-propanol, 4-hydroxy-4-methyl-2-pentanone, and/or mixtures or derivatives thereof. The solvent preferably further contains 4-methyl-2-pentanone (MIBK: methyl isobutyl ketone) and/or derivatives thereof.

With the method according to the invention, a protective coating that protects the polymer workpiece against mechanical and chemical damage as well as UV radiation is preferably applied on the polymer workpiece. Preferably used are thermally hardening or UV-hardening coating systems based on polysiloxanes, polyacrylates, polymethacrylates, and/or polyurethanes. The protective coating preferably has a layer thickness from 1 µm to 50 µm, particularly preferably from 2 µm to 25 µm. This is particularly advantageous with regard to the protective action of the coating.

In addition to coloring compounds and pigments, the coating can also contain UV-blockers and preservatives as well as components to increase scratch resistance, for example, nanoparticles.

After application, the protective coating is hardened preferably by temperature and/or UV light input.

Products suitable as protective coating are, for example, AS4000, AS4700, variants of PHC587 or UVHC3000, which are provided by the company Momentive.

By repeated flooding of the polymer workpiece, multiple identical or different layers can even be applied. The polymer workpiece is preferably dried between the application of different layers.

Before the protective coating, an adhesion-promoting layer is preferably applied to the polymer workpiece. The adhesion-promoting layer can, for example, contain acrylates and have a layer thickness from 0.4 µm to 5 µm. The protective coating can, for example, contain polysiloxanes and have a layer thickness from 1 µm to 15 µm.

The method according to the invention can include other process steps, for example, a localised heating of the polymer workpiece before the application of the coating solution, preferably in a region of the upper main surface adjacent the flow attack edge surface, or bombardment of the coating solution with a stream of air, preferably in a region of the upper main surface adjacent the flow attack edge surface. Such measures increase the evaporation of the solvent found in the coating solution and increase the viscosity of the coating solution. The increased viscosity slows the flow-off of the coating solution in the region below the flow attack edge surface and equalises the layer thickness of the coating in the vicinity of the flow attack edge with the layer thickness of the coating in the vicinity of the opposite edge. This is particularly advantageous with regard to a uniform layer thickness of the coating.

The polymer workpiece is preferably used as a pane, as a component of a pane, or as a plastic covering of means of transportation for travel on land, in the air, or on water, in particular as a rear window, windshield, side window, roof window, headlight cover, trim strip, and/or as a motor vehicle roof of passenger vehicles, trucks, buses, streetcars, subways, trains, and motorcycles. The polymer workpiece can also be used in functional and/or decorative individual pieces or as a built-in component in furniture and devices.

Figure 5:
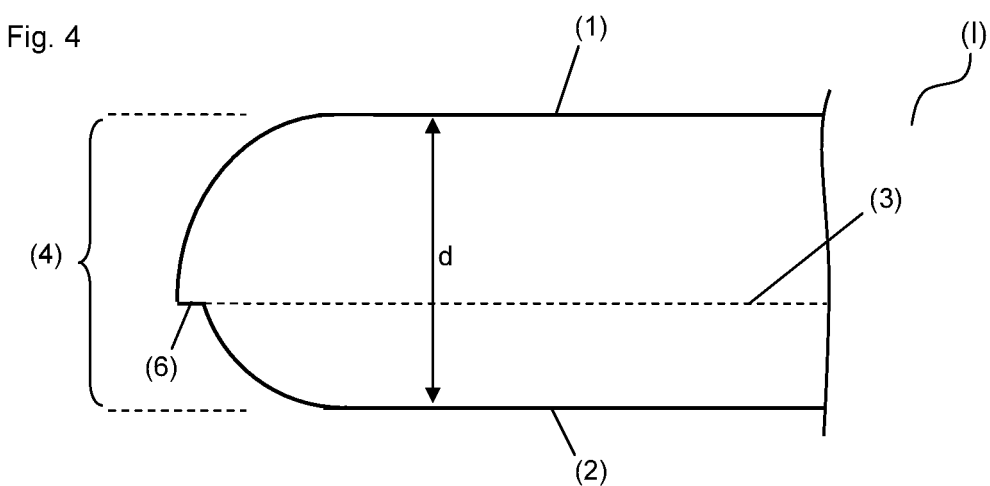
Figure 6:
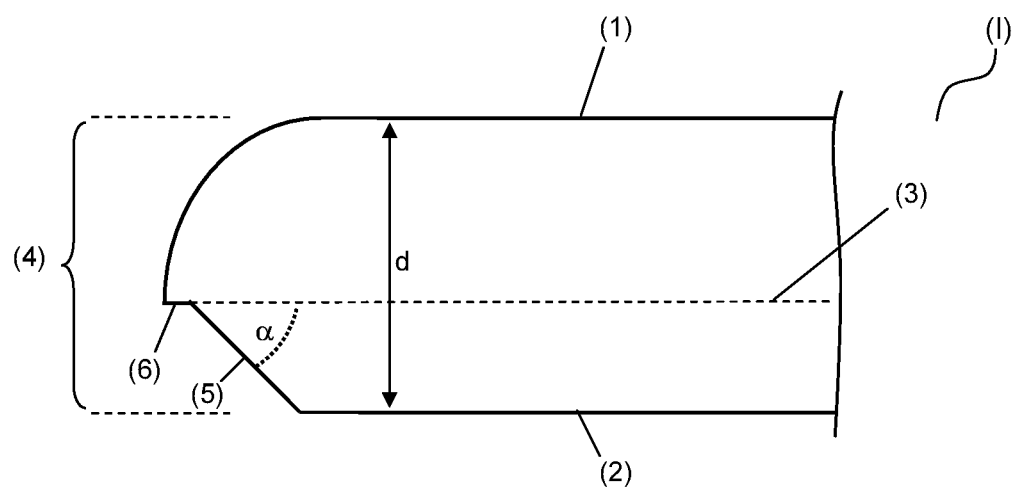
Figure 7:
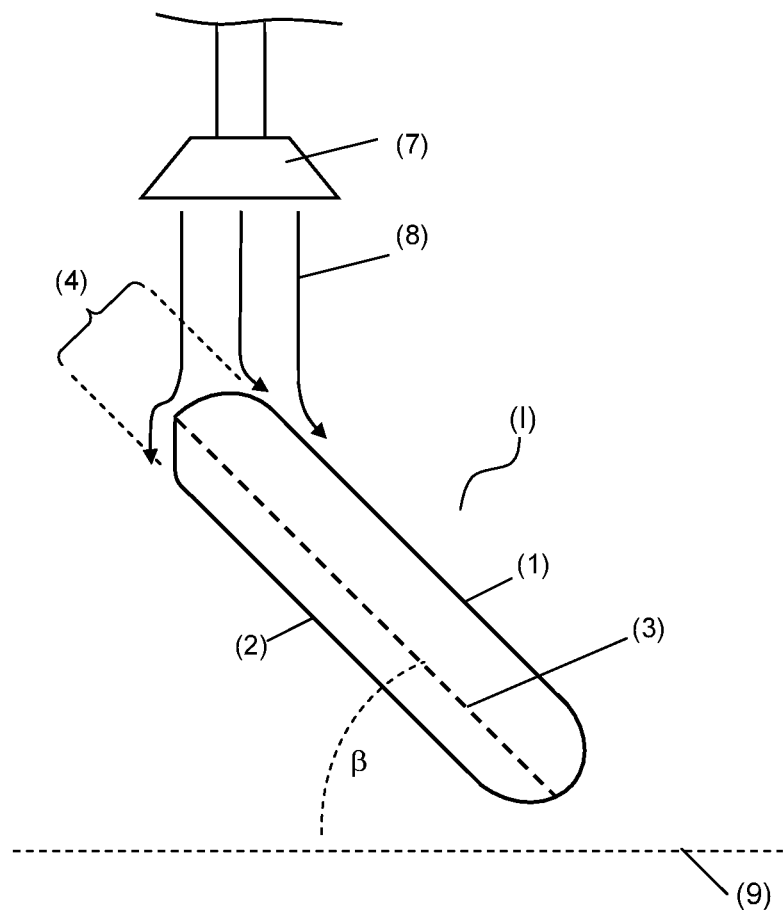
Figure 8:
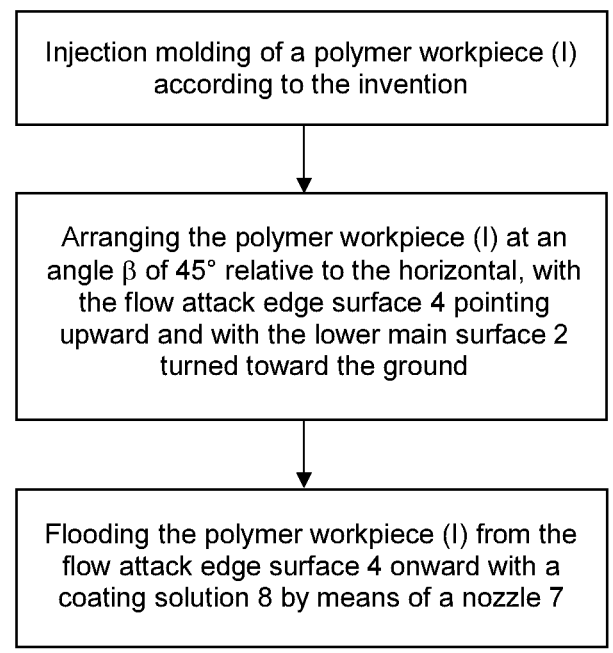

The invention is explained in detail with reference to drawings and exemplary embodiments. The drawings are schematic representations and not true to scale. The drawings in no way restrict the invention. They depict:

FIG. 1 a cross-section through a polymer workpiece according to the prior art,

FIG. 2 a cross-section through a first embodiment of the polymer workpiece according to the invention, FIG. 3 a cross-section through another embodiment of the polymer workpiece according to the invention, FIG. 4 a cross-section through another embodiment of the polymer workpiece according to the invention, FIG. 5 a cross-section through another embodiment of the polymer workpiece according to the invention, FIG. 6 a cross-section through another embodiment of the polymer workpiece according to the invention, FIG. 7 a cross-section through a polymer workpiece according to the invention during the flow coating, and FIG. 8 a detailed flowchart of the method according to the invention for producing a coated polymer workpiece.

FIG. 1 depicts a cross-section through a polymer workpiece (I) produced by injection molding according to the prior art in the region of the flow attack edge surface 4. The polymer workpiece (I) is a roof pane of a motor vehicle. The polymer workpiece (I) has a length of 1 m and a width of 1 m. The polymer workpiece (I) contains polycarbonate (PC). The polymer workpiece (I) has an upper main surface 1, a lower main surface 2, an injection-mold separating surface 3, and a flow attack edge surface 4. The upper main surface 1 and the lower main surface 2 are implemented flat and parallel to each other. The thickness d of the polymer workpiece (I) adjacent the flow attack edge surface 4 is 5 mm.

The injection-mold separating surface 3 is the surface that is spanned during injection molding of the polymer workpiece by the boundary line between the two injection molds. The injection-mold separating surface 3 is arranged parallel to the main surfaces 1, 2. The distance of the injection-mold separating surface 3 from the upper main surface 1 is 3.2 mm and thus 64% of the thickness d of the polymer workpiece (I).

The upper main surface 1 is provided as the external surface of the roof pane. Consequently, it is exposed to special mechanical and chemical stresses as well as UV radiation. The upper main surface 1 must, consequently, be provided with a protective coating.

The flow attack edge surface 4 is intended to point upward during the flow coating of the polymer workpiece (I). The polymer workpiece (I) is arranged at that time at an angle from 25° to 85° relative to the horizontal 9, with the lower main surface 2 facing the ground. The polymer workpiece (I) is flooded from the flow attack edge surface 4 onward with the coating solution 8. Through the evaporation of the solvent of the coating solution 8, the upper main surface 1 is provided with a coating.

The flow attack edge surface 4 is formed rounded. The cross-section of the flow attack edge surface 4 forms a convex curve with a non-constant radius of curvature. Both the region of the flow attack edge surface 4 between the upper main surface 1 and the injection-mold separating surface 3 and also the region of the flow attack edge surface 4 between the injection-mold separating surface 3 and the lower main surface 2 deviate significantly from a planar surface.

In the flow coating of polymer workpieces (I) according to the prior art, flow problems of the coating, which present themselves in particular as coating runs, are frequently observed in the region of the upper main surface 1 adjacent the flow attack edge surface.

FIG. 2 depicts a cross-section through an embodiment of the polymer workpiece according to the invention (I) in the region of the flow attack edge surface 4. The region of the flow attack edge surface 4 between the upper main surface 1 and the injection-mold separating surface 3 is formed convexly curved according to the prior art. The region 5 of the flow attack edge surface 4 between the injection-mold separating surface 3 and the lower main surface 2 is formed as a planar surface. The angle α between the region 5 of the flow attack edge surface 4 and the injection-mold separating surface 3 is 45°. The region 5 of the flow attack edge surface 4 can, in comparison to the embodiment according to the prior art in FIG. 1, be regarded as beveling.

By means of the region 5 of the flow attack edge surface 4, during the flow coating, the coating solution 8 is more intensely guided via the flow attack edge surface 4 in the direction of the lower main surface 2. The coating solution 8 can thus not flow increasingly onto the upper main surface 1. Flow problems of the coating, for example, coating runs, can thus surprisingly reduced or even completely avoided.

FIG. 3 depicts a cross-section through another embodiment of the polymer workpiece according to the invention (I) in the region of the flow attack edge surface 4. The region 5 of the flow attack edge surface 4 between the injection-mold separating surface 3 and the lower main surface 2 is formed as a planar surface. In the transition region to the lower main surface 2, the flow attack edge surface 4 has a production-related curvature. The characteristic of the flow attack edge surface 4 according to the invention, in this case, the configuration of the region 5 as a planar surface, is considered fulfilled even in the presence of the production-related curvature in the transition region between the flow attack edge surface 4 and the lower main surface 2.

FIG. 4 depicts a cross-section through another embodiment of the polymer workpiece according to the invention (I) in the region of the flow attack edge surface 4. The region 5 of the flow attack edge surface 4 is implemented slightly convexly curved. A planar surface 5', which encloses an angle α of 45° with the injection-mold separating surface can be adapted to the region 5. Each point on the flow attack edge surface 4 has a vertical distance a to the surface 5' less than or equal to 0.18 mm. The maximum amount a is measured in the center of the region 5 of the flow attack edge surface 4 and is 0.18 mm.

The polymer workpiece (I) is produced by multicomponent injection molding. The polymer workpiece (I) comprises a transparent component 10 with a thickness of 5 mm. The transparent component 10 contains polycarbonate (PC). A surface of the transparent component 10 forms the upper main surface 1 of the polymer workpiece (I). An opaque component 11 is applied on a region of the transparent component 10 opposite the upper main surface 1. The shaping element formed by the opaque component 11 improves the mechanical properties of the polymer workpiece (I) and serves as a design element as well as for fixing the polymer workpiece (I) at the site of use as a roof window. The opaque component 11 contains a mineral-filled polycarbonate (PC)-polyethylene terephthalate (PET) mixture. The starting material for the injection molding of the opaque component 11 was provided by the company Bayer MaterialScience AG (Makroblend DP7665 MBS162-color code 751092).

The lower main surface 2 of the polymer workpiece (I) has a smooth region implemented parallel to the upper main surface 1, which is adjacent the flow attack edge surface and is formed by a surface of the transparent component 10. The thickness d of the polymer workpiece (I) adjacent the flow attack edge surface 4 according to the invention is the distance between the smooth upper surface 1 and the smooth region of the lower main surface 2 adjacent the flow attack edge surface 4. The thickness d is 5 mm.

FIG. 5 depicts a cross-section through another embodiment of the polymer workpiece according to the invention (I) in the region of the flow attack edge surface 4. The region of the flow attack edge surface 4 between the upper main surface 1 and the injection-mold separating surface 3 is formed convexly rounded. The region 5 of the flow attack edge surface 4 between the injection-mold separating surface 3 and the lower main surface 2 is likewise formed convexly rounded. A region 6 of the flow attack edge surface 4 facing the lower main surface 2 with a length of 0.03 mm runs along the injection-mold separating surface 3. During the flow coating of the polymer workpiece (I), by means of this offset within the flow attack edge surface 4, the coating solution 8 is guided more intensely over the flow attack edge surface 4 in the direction of the lower main surface 2. The coating solution 8 can thus not increasingly flow onto the upper main surface 1. Flow problems of the coating can thus surprisingly be reduced or even completely avoided.

FIG. 6 depicts a cross-section through another embodiment of the polymer workpiece according to the invention (I) in the region of the flow attack edge surface 4. The region 6 of the flow attack edge surface 4 facing the lower main surface of the flow attack edge surface 4 with a length of 0.04 mm runs along the injection-mold separating surface 3. The region 5 of the flow attack edge surface 4 between the injection-mold separating surface 3 and the lower main surface 2 is formed as a planar surface with an angle α relative to the injection-mold separating surface 3 of 50°. By means of the combination of the region 6 along the injection-mold separating surface 3 and of the region 5 configured as a planar surface, particularly good results are obtained in the flow coating of the polymer workpiece (I). Flow problems of the coating can be significantly reduced.

FIG. 7 depicts a cross-section through a polymer workpiece (I) according to the invention during the flow coating. The polymer workpiece (I) is arranged at an angle β of 50° relative to the horizontal 9 and fixed with a holder (not shown). The flow attack edge surface 4 is configured according to FIG. 2. The flow attack edge surface 4 configured according to the invention points upward. The lower main surface 2 is turned toward the ground. By means of a nozzle 7, the polymer workpiece (I) is flooded from the flow attack edge 4 onward with a coating solution. The nozzle 7 can be moved along of the flow attack edge surface 4 by a robot arm. The coating solution contains 20 wt.-% of polysiloxanes and, as solvents, methanol, n-butanol, and isopropanol. Through evaporation of the solvent, the upper main surface 1 is provided with a coating that contains polysiloxanes. The coating serves as a protective coating against mechanical and chemical damage as well as against UV radiation.

By means of the configuration according to the invention of the flow attack edge surface 4, significantly improved coating results in comparison to the prior art are obtained. The coating solution 8 is guided more intensely over the flow attack edge surface 4 in the direction of the the lower main surface 2. The coating solution 8 can thus not flow increasingly onto the upper main surface 1. Flow problems of the coating can surprisingly be reduced or even completely avoided.

FIG. 8 depicts a flowchart of an exemplary embodiment of the method according to the invention for producing a coated polymer workpiece (I).

Polymer workpieces (I) according to the invention were produced and provided, according to the invention, with a coating on the upper main surface 1 by means of flow coating. The upper main surface 1 was then investigated for flow problems of the coating, in particular for coating runs. In comparison with polymer workpieces (I) with a conventionally configured flow attack edge 4, such coating runs were observed in the region of the upper main surface 1 adjacent the flow attack edge surface 4 on a significantly lower number of test specimens.

It was unexpected and surprising for the person skilled in the art that significantly improved coating results can be obtained by means of a change in the configuration of the flow attack edge surface 4.

LIST OF REFERENCE CHARACTERS (I) polymer workpiece
(1) upper main surface
(2) lower main surface
(3) injection-mold separating surface
(4) flow attack edge surface
(5) region of (4) between (3) and (2)
(5') planar surface adapted to (5)
(6) region of (4) along (3)
(7) nozzle
(8) coating solution
(9) horizontal
(10) transparent component of (I)
(11) opaque component of (I)
α angle between (3) and (5)/(5')
β angle between (I) and (9)
a vertical distance between (5) and (5')
d thickness of (I) adjacent the flow attack edge surface

What is claimed is:

1. A polymer workpiece configured to reduce flow coating problems at an upper main surface of the polymer workpiece, the polymer workpiece comprising:
    an upper main surface,
    a lower main surface,
    an injection-mold separating surface being an internal surface between the upper main surface and the lower main surface, and
    a flow attack edge surface being an external surface between the upper main surface and the lower main surface, the flow attack edge surface comprising an upper attack surface and a lower attack surface,
    wherein the upper attack surface is an entire region of the flow attack edge surface between the injection-mold separating surface and the upper main surface, and is formed as a convexly curved surface having an upper attack surface radius of curvature,
    wherein the lower attack surface is an entire region of the flow attack edge surface between the injection-mold separating surface and the lower main surface, and is formed as a planar or convexly curved surface that deviates by an amount a from 0.0 mm to 0.5 mm from a planar surface that has an angle α relative to the injection-mold separating surface from 20° to 70°,
    wherein the planar surface passes through i) a junction point of the upper attack surface and the injection-mold separating surface, and ii) a junction point of the lower main surface and the lower attack surface, and wherein the upper attack surface radius of curvature, the amount a and the angle α are configured to guide a flow coating solution flooded onto the flow attack edge predominantly to the lower main surface to reduce flow coating problems at the upper main surface.

2. The workpiece according to claim 1, wherein the angle α is from 30° to 60°.

3. The workpiece according to claim 1, wherein the amount a is from 0.0 mm to 0.3 mm.

4. The workpiece according to claim 1, wherein the lower attack surface is convexly curved having a radius of curvature larger than the upper attack surface radius of curvature, and a maximum of the amount a is preferably arranged in a center of the region.

5. The workpiece according to claim 1, wherein the injection-mold separating surface is arranged at a distance from the upper main surface of 20% to 80% of a thickness d of the polymer workpiece adjacent the flow attack edge surface.

6. The workpiece according to claim 1, containing at least polycarbonates (PC), polyethylene terephthalate (PET), and/or polymethyl methacrylate (PMMA).

7. The workpiece according to claim 1, having a thickness d adjacent the flow attack edge surface from 1 mm to 10 mm.

8. The workpiece according to claim 1, wherein the angle α is from 35° to 55°.

9. The workpiece according to claim 1, wherein the amount a is from 0.0 mm to 0.2 mm.

10. The workpiece according to claim 1, wherein the region of the flow attack edge surface is flat and a maximum of the amount a is 0.0 mm.

11. The workpiece according to claim 1, wherein the injection-mold separating surface is arranged at a distance from the upper main surface of 33% to 67% of a thickness d of the polymer workpiece adjacent the flow attack edge surface.

12. The workpiece according to claim 1, having a thickness d adjacent the flow attack edge surface from 2 mm to 7 mm.

13. The workpiece according to claim 4, wherein the upper attack surface is more sharply curved than the lower attack surface.

14. A polymer workpiece configured to reduce flow coating problems at an upper main surface of the polymer workpiece, the polymer workpiece comprising:
   an upper main surface,
   a lower main surface,
   an injection-mold separating surface including a surface region being an external surface between the upper main surface and the lower main surface, and
   a flow attack edge surface comprising an upper attack surface, a lower attack surface, and the surface region of the injection-mold separating surface that joins the upper attack surface to the lower attack surface,
   wherein the surface region of the injection-mold separating surface is a region of the flow attack edge surface facing the lower main surface running with a length from 0.005 mm to 0.1 mm along the injection-mold separating surface,
   wherein the upper attack surface is an entire region of the flow attack edge surface between the injection-mold separating surface and the upper main surface that is formed as a convexly curved surface having an upper attack surface radius of curvature, and wherein the upper attack surface radius of curvature and the length from 0.005 mm to 0.1 mm are configured to guide a flow coating solution flooded onto the flow attack edge predominantly to the lower main surface to reduce flow coating problems at the upper main surface.

15. The workpiece according to claim 14, wherein the region of the flow attack edge surface has a length from 0.01 mm to 0.05 mm.

16. The workpiece according to claim 14, wherein the lower attack surface is formed as a planar or convexly curved surface that deviates by an amount a from 0.0 mm to 0.5 mm from a planar surface that has an angle α relative to the injection-mold separating surface from 20° to 70°.

17. The workpiece according to claim 16, wherein the angle α is from 30° to 60°.

18. The workpiece according to claim 16, wherein the angle α is from 35° to 55°.

19. The workpiece according to claim 16, wherein the amount a is from 0.0 mm to 0.3 mm.

20. The workpiece according to claim 16, wherein the amount a is from 0.0 mm to 0.2 mm.

21. The workpiece according to claim 16, wherein the amount a is from 0.0 mm to 0.0 mm.

22. A method for producing a coated polymer workpiece, comprising:
   providing a polymer workpiece comprising an upper main surface, a lower main surface, an injection-mold separating surface between the upper main surface and the lower main surface that is an internal surface, and a flow attack edge surface comprising an upper attack surface and a lower attack surface,
      wherein the upper attack surface is an entire region of the flow attack edge surface between the injection-mold separating surface and the upper main surface, and is formed as a convexly curved surface having an upper attack surface radius of curvature,
      wherein the lower attack surface is an entire region of the flow attack edge surface between the injection-mold separating surface and the lower main surface, and is formed as a planar or convexly curved surface that deviates by an amount a from 0.0 mm to 0.5 mm from a planar surface that has an angle α relative to the injection-mold separating surface from 20° to 70°, and
      wherein the planar surface passes through i) a junction point of the upper attack surface and the injection-mold separating surface, and ii) a junction point of the lower main surface and the lower attack surface, and
      wherein the flow attack edge surface is an external surface between the upper main surface and the lower main surface,
   arranging the polymer workpiece with the flow attack edge surface pointing upward at an angle α relative to horizontal from 25° to 85°, wherein the lower main surface is facing ground,
   flooding the polymer workpiece from the flow attack edge surface onward with a coating solution, and
   based on the flooding, the upper attack surface radius of curvature, the amount a, and the angle α, guiding the coating solution predominantly to the lower main surface and thereby reducing flow coating problems at the upper main surface.

23. The method according to claim 22, wherein the workpiece is provided by a single- or multi-component injection-molding or by a single- or multi-component injection-compression molding.

24. The method according to claim 22, wherein a configuring of the flow attack edge surface is done by offset guiding of the two injection-molds against each other, by different tempering of the two injection-molds, or by processing steps downstream from the injection-molding such as milling, grinding, filing, or cutting.

25. The method according to claim 22, wherein the angle α is from 35° to 70°.

26. The method according to claim 22, wherein at least two identical or different coatings are applied by repetition of the flooding of the polymer workpiece.

27. The method according to claim 22, wherein at least two identical or different coatings are applied by repetition of the flooding of the polymer workpiece.

28. A method comprising:
using a polymer workpiece as a pane, as a component of a pane, as a plastic covering of means of transportation for travel on land, in the air, or on water used, in particular as a rear window, windshield, side window, roof window, headlight cover, trim strip, and/or as a motor vehicle roof of passenger vehicles, trucks, buses, streetcars, subways, trains, and motorcycles,
wherein the polymer workpiece comprises an upper main surface, a lower main surface, an injection-mold separating surface between the upper main surface and the lower main surface that is an internal surface, and a flow attack edge surface comprising an upper attack surface and a lower attack surface,
wherein the upper attack surface is an entire region of the flow attack edge surface between the injection-mold separating surface and the upper main surface, and is formed as a convexly curved surface having an upper attack surface radius of curvature,
wherein the lower attack surface is an entire region of the flow attack edge surface between the injection-mold separating surface and the lower main surface, and is formed as a planar or convexly curved surface that deviates by an amount a from 0.0 mm to 0.5 mm from a planar surface that has an angle α relative to the injection-mold separating surface from 20° to 70°,
wherein the planar surface passes through i) a junction point of the upper attack surface and the injection-mold separating surface, and ii) a junction point of the lower main surface and the lower attack surface, and
wherein the flow attack edge surface is an external surface between the upper main surface and the lower main surface and
wherein the upper attack surface radius of curvature, the amount a and the angle α are configured to guide a flow coating solution flooded onto the flow attack edge predominantly to the lower main surface to reduce flow coating problems at the upper main surface.

29. A method for producing a coated polymer workpiece, comprising:
providing a polymer workpiece comprising an upper main surface, a lower main surface, an injection-mold separating surface including a surface region being an external surface between the upper main surface and the lower main surface, and a flow attack edge surface comprising an upper attack surface, a lower attack surface, and the surface region of the injection-mold separating surface that joins the upper attack surface to the lower attack surface,
wherein the surface region of the injection-mold separating surface is a region of the flow attack edge surface facing the lower main surface runs with a length from 0.005 mm to 0.1 mm along the injection-mold separating surface,
wherein the upper attack surface is an entire region of the flow attack edge surface between the injection-mold separating surface and the upper main surface that is formed as a convexly curved surface having an upper attack surface radius of curvature, and
wherein the flow attack edge surface is an external surface between the upper main surface and the lower main surface,
arranging the polymer workpiece with the flow attack edge surface pointing upward at an angle α relative to horizontal from 25° to 85°, wherein the lower main surface is facing ground,
flooding the polymer workpiece from the flow attack edge surface onward with a coating solution, and
based on the flooding, the upper attack surface radius of curvature, the length from 0.005 mm to 0.1 mm, and the angle α, guiding the coating solution predominantly to the lower main surface and thereby reducing flow coating problems at the upper main surface.

30. A method comprising:
using a polymer workpiece as a pane, as a component of a pane, as a plastic covering of means of transportation for travel on land, in the air, or on water used, in particular as a rear window, windshield, side window, roof window, headlight cover, trim strip, and/or as a motor vehicle roof of passenger vehicles, trucks, buses, streetcars, subways, trains, and motorcycles,
wherein the polymer workpiece comprises an upper main surface, a lower main surface, an injection-mold separating surface including a surface region being an external surface between the upper main surface and the lower main surface, and a flow attack edge surface comprising an upper attack surface, a lower attack surface, and the surface region of the injection-mold separating surface that joins the upper attack surface to the lower attack surface,
wherein the surface region of the injection-mold separating surface is a region of the flow attack edge surface facing the lower main surface that runs with a length from 0.005 mm to 0.1 mm along the injection-mold separating surface,
wherein the upper attack surface is an entire region of the flow attack edge surface between the injection-mold separating surface and the upper main surface that is formed as a convexly curved surface having an upper attack surface radius of curvature,
wherein the flow attack edge surface is an external surface between the upper main surface and the lower main surface, and
wherein the upper attack surface radius of curvature and the length from 0.005 mm to 0.1 mm are configured to guide a flow coating solution flooded onto the flow attack edge predominantly to the lower main surface to reduce flow coating problems at the upper main surface.

* * * * *